B. C. BRADLEY.
Wrench.

No. 7,910. Reissued Oct. 16, 1877.

Witnesses:
C. W. Bond
Jno. D. Patten.

Inventor:
Byron C. Bradley.
By Wm. H. Bond Attys.

N. PETERS, PHOTO-LITHOGRAPHER, WASHINGTON, D. C.

UNITED STATES PATENT OFFICE.

BYRON C. BRADLEY, OF CHICAGO, ILLINOIS.

IMPROVEMENT IN WRENCHES.

Specification forming part of Letters Patent No. 155,139, dated September 22, 1874; Reissue No. 7,910, dated October 16, 1877; application filed September 24, 1877.

*To all whom it may concern:*

Be it known that I, BYRON C. BRADLEY, of the city of Chicago, in the county of Cook and State of Illinois, have invented certain new and useful Improvements in Wrenches; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
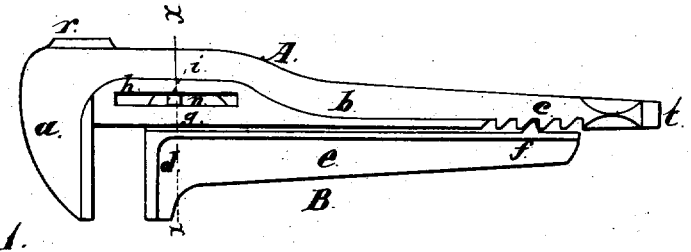
Figure 5:
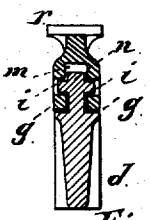
Figure 2:
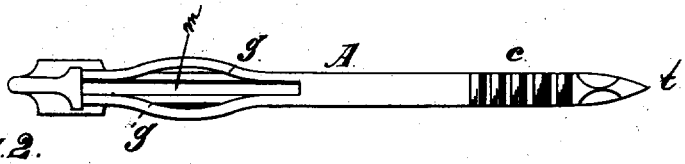
Figure 3:
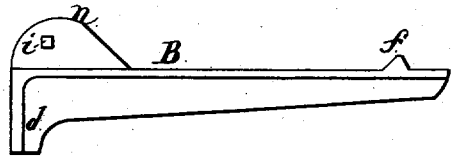
Figure 4:
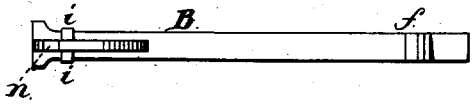

Figure 1 is a side view; Fig. 2, an inside view of one part, A, of the wrench; Fig. 3, a side view of the part marked B; Fig. 4, an inside view of B; Fig. 5, a cross-section on line *x x* of Fig. 1.

This invention is an improvement on a wrench for which Letters Patent have been heretofore granted to me; and it consists in holding the two parts together by means of projections and grooves, and so that one part can slide upon the other.

In the drawings, A and B represent the two parts of the wrench. *a* represents one jaw; *b*, one part of the handle; *c*, notches in *b*. *d* is the other jaw; *e*, the other part of the handle, and *f* a projection on *e* to engage with the notches *c*.

On the back side of the part B is an ear, *n*, having a projection, *i*, on each side. On the inside of A is a long deep recess, *m*, between the two walls *g g*, and in each of these walls is a long slot, *h*.

The two parts A B can be cast, using malleable iron. The mold in which A is to be cast is to be so formed that when cast the walls *g* will be bent outward, as shown in Fig. 2, far enough to allow the ear *n* and its projections *i* to pass between them. In casting, the walls of the recess which receive the ear *n* are not to be spread below the slot *h*.

When the two parts have been brought together, which is to be done after *g g* have been annealed, these parts *g g* can be straightened by a suitable blow, which will complete the wrench. The projections *i i*, being then in place in the slots or grooves *h*, will be prevented from escaping by the parts *g g*, the same having been straightened.

By means of the notches *c* and projection *f* the wrench can be adjusted to nuts of various sizes, and, in use, the ordinary pressure of the hand will hold the two parts together.

The wrench can be used as a hammer for light purposes, *r* being the face of such hammer, and the end *t* of A can be so shaped that it can be used as a screw-driver.

The parts *g g* can be cast straight, and then be spread apart to receive the projections *i i*.

What I claim as new, and desire to secure by Letters Patent, is as follows:

1. The part A, consisting of the jaw *a* and handle *b*, in combination with the movable part B, consisting of the jaw *d* and handle *e*, the two parts being held together and arranged to slide upon each other by means of grooves and projections on each side, substantially as specified.

2. The combination of the two parts A and B, the former having a recess, *m*, slots *h*, and notches *c*, and the latter having an ear, *n*, provided with projections *i* and projection *f*, substantially as and for the purposes specified.

BYRON C. BRADLEY.

Witnesses:
E. A. WEST,
O. W. BOND.